United States Patent Office 3,697,288
Patented Oct. 10, 1972

3,697,288
VIBRATION ENERGY MILLING OF GROUND COFFEE SLURRIES
Joseph R. McSwiggin, Cincinnati, Ohio. assignor to The Procter & Gamble Company, Cincinnati, Ohio
No Drawing. Filed Mar. 27, 1970, Ser. No. 23,511
Int. Cl. A23f 1/08
U.S. Cl. 99—71
4 Claims

ABSTRACT OF THE DISCLOSURE

Vibration energy milling of ground coffee slurries to provide a sediment-free additive for instant coffee.

BACKGROUND OF THE INVENTION

Typical instant coffee processing generally involves three basic steps: countercurrently extracting roast and ground coffee with aqueous extraction liquor, concentrating the resulting extract, preferably to at least 50% solubles concentration, and finally, drying the extract to provide a dry instant coffee product. In line with the continuing effort towards an instant coffee product with exact flavor duplication of roast and ground coffee, from time to time various process improvements have been made upon these three basic hereinbefore described steps. Of the various methods which have been employed in an effort to replace the coffee flavor values lost during the basic instant coffee processing steps, the most commonly employed are (1) steam distilling of volatiles from roast and ground coffee prior to extraction and subsequently adding the distillate back to the extract concentrate, (2) extracting coffee oil from roast coffee beans and subsequently spraying the coffee oil on the resulting instant coffee product, and (3) adding steam-stripped aroma volatiles to instant coffee by spraying the aroma volatiles thereon. Each of these techniques has enjoyed some success and are used throughout the coffee industry.

Since the basic object of each of these process improvements is to duplicate the flavor and aroma of roast and ground coffee, it has been suggested by some workers skilled in the art that roast and ground coffee per se could be added to instant coffee in small amounts in an effort to improve the flavor and aroma of instant coffee. However, heretofore the addition of roast and ground coffee to instant coffee at levels sufficiently high to provide flavor and aroma improvement of the instant coffee caused a high level of cup sediment to appear in the prepared cups of instant coffee beverage. The cup sediment appeared for the principal reason that the solubility level of roast and ground coffee (i.e. about 25) is substantially lower than the solubility level of instant coffee. Therefore, while flavor and aroma were improved by adding roast and ground coffee, a high level of cup sediment was produced when the required amounts of roast and ground coffee were added. Consumers regarded the high level of cup sediment as undesirable and accordingly, while flavor and aroma were improved, consumer acceptance was decreased because of the accompanying cup sediment.

In an effort to overcome the cup sediment problem while retaining the benefits of adding roast and ground coffee to instant coffee, some workers have turned to the idea of finely dispersing the roast and ground coffee by colloid milling. For example, see French Pat. 1,495,566, and South African patent application 68/1387, which was published in 1968. The French patent discloses suspending in water roast and ground coffee and thereafter reducing particle size by use of a colloid mill to produce a suspension of fine roast and ground coffee in water. The colloidal suspension produced by the colloid milling process is thereafter admixed with liquid coffee extract and spray-dried to produce a soluble coffee product. The South African application discloses making colloidal suspensions from pre-extracted coffee grounds and not from unextracted high aroma and flavor roast and ground coffee.

While the French patent does describe colloidal suspension of roast and ground coffee in water and thereafter using the colloidal suspension to add back to an instant coffee extract, the French patent does not disclose vibration energy milling. This distinction is critical because colloid milling does not work to form high levels of roast and ground coffee suspended in water, and on the other hand, vibration energy milling does. The term "high levels of roast and ground coffee suspended in water" is intended to encompass levels in excess of 70% by weight of the roast and ground coffee employed. The low level of suspension is actually brought out in the French patent in which the dispersibility range is shown to be from about 37% to 43%. Accordingly, the process of the French patent does not represent a feasible method of colloidally dispersing roast and ground coffee in water at high levels, which, when added back to an instant coffee extract and subsequently dried, provides a flavor and aroma improvement without also providing a high level of cup sediment.

Accordingly, it is an object of this invention to provide colloidal dispersions of roast and ground coffee in water wherein the percentage of dispersibility is in excess of 70% by weight of the roast and ground coffee employed.

An additional object of this invention is to provide high levels of colloidal dispersion of roast and ground coffee in water such that when said dispersion is added back to an instant coffee extract and subsequently dried, a significant amount of flavor and aroma improvement in the instant coffee can be seen. Yet another object is to provide a flavor- and aroma-improved instant coffee product having small amounts of roast and ground coffee dispersed therein which does not provide high levels of cup sediment upon preparation into an instant coffee beverage.

The method of accomplishing these and other objects will be apparent from the following description.

SUMMARY OF THE INVENTION

This invention relates to a method of producing a colloidal dispersion of roast and ground coffee in water, wherein the level of dispersibility is in excess of 70% by weight of the roast and ground coffee employed, said method comprising vibration energy milling a water/roast and ground coffee slurry, said slurry comprising from 5% to 10% by weight of roast and ground coffee.

DETAILED DESCRIPTION OF THE INVENTION

Normal size reduction methods such as colloid milling provide from about 40% to about 65% dispersibility of a 5% to 10% ground coffee slurry. As used herein, the "percent dispersibility" refers to the weight percent of roast and ground coffee present in a roast and ground coffee slurry which actually goes into solution and/or into the state of colloidal suspension. The phrase "percent ground coffee slurry" refers to a slurry which is comprised of water and ground coffee and, for example, in a 10% slurry, is 10% roast and ground coffee and 90% water. The levels of dispersion, i.e. 40% to 65% obtainable by colloid milling, are insufficient to provide a sediment-free dispersion of roast and ground coffee capable of being added back to instant coffee because (1) 40% to 65% dispersibility is too low to provide any significant flavor and aroma improvement, and (2) where the level of dispersibility is as low as 40% to 65%, a substantial amount of cup sediment results when preparing beverage from the flavor-improved instant coffee which has the dispersed roast and ground coffee added to it.

An important part of this invention is the critical nature of vibration energy milling which is operable in applicant's process, and the distinction between vibration energy milling and colloid milling, which is not operable in applicant's process.

Colloid milling is to be distinguished from vibration energy milling and involves a substantial shearing action. In colloid milling, a fluid containing the substance to be milled is passed between two surfaces that move at high velocity and at a very close clearance with respect to each other. The high velocity milling provides a substantial shearing action which size-reduces the particles contained in the fluid. Modern colloid mills fall into three main groups: (1) the hammermill, (2) the smooth surface mill, and (3) the rough surface-type mill. Principally, colloid mills are used for the dispersion of finely divided solid particles into liquid mediums. However, as heretofore mentioned, the percentage of dispersibility is never greater than from 40% to 65%.

Distinct from the colloid milling, as described above, is vibration energy milling, which is a part of the process of this invention. Vibration energy milling, contra to colloid milling as above described, involves very little shearing forces and nearly all impact forces. Vibration energy milling is conducted within a milling vessel which is shaped similar to a washing machine tub. Also, like a washing machine tub, a vibration energy milling vessel is suspended in such a manner that it is capable of being vibrated. The vibrating vessel is packed with a packing media which provides the desired impact force to the material which is to be size reduced. The packing medium, depending upon its size, may fill from 60% to 80% of the volume of the vibrating vessel and the remaining portion is interstitial voids. The material to be size reduced when introduced into the vessel fills the interstitial voids, and during the vibrating process is subjected to impact by the packing media which size reduces the particles contained within the voids.

Ultra-fine grinding capable of producing in excess of 70% dispersibility of a 5% to 10% ground coffee slurry in order to be economical in terms of coffee processing, must meet the following requirements: (1) relatively small forces need to be applied at very high frequencies to thin layers of the process material, and (2) certain physical-chemical effects due to the vast new surface area produced, need to be overcome, i.e. tendency of very fine particles to coalesce and the increased propensity of colloidal size coffee to stale.

Vibration energy milling fulfills the requirements for fine grinding as stated above. In vibration energy milling, large numbers of impacts are produced on thin layers of charged material; however, the impact forces produced are considerable and capable of providing in excess of 70% dispersibility of roast and ground coffee in a water/roast and ground coffee slurry. In vibration energy milling, the grinding media and the charge (roast and ground coffee slurry) are maintained in a close-packed system and submitted to high frequency vibration, producing a large amount of impact force and only a slight, if any, amount of shearing forces.

In a close-packed media system such as that described herein, the packing medium occupies a great proportion of the volume of the vibrating vessel. If, for example, the packing media is cylindrical in shape, the volume of the media will occupy approximately 75% of the volume of the vibrating vessel, and the remaining 25% portion of the volume is interstices which are occupied by the charged material which is to be size reduced, in this case, roast and ground coffee slurry. The vibrating vessel is mounted in such a manner that it is capable of being vibrated three-dimensionally; that is, the vessel is mounted in such a manner that it is suspended on springs to allow vibration in every plane.

Since each piece of the packing medium which is utilized to size reduce the roast and ground coffee slurry is in contact with adjacent media, the energy imparted by the wall of the vibrating vessel is effectively transmitted through the entire media and through the entire slurry of roast and ground coffee. Because the media in the vibrating vessel is closely packed, it vibrates without appreciable relative movement and therefore shearing forces are substantially reduced.

In typical operation, vibration is provided by out-of-balance weights attached to each end of the extended shaft of an electric motor, the out-of-balance weights being disposed at equal distances above and below the center of gravity of the vibrating vessel.

As the voidage of a vibration energy mill system is decreased so the layers of material to be size-reduced become thinner, conditions for ultra-fine colloidal suspension improve. The most commonly utilized shapes as packing and/or grinding media are spheres, cylinders, cubes, prisms, and other more random shapes. The voidage for cylinders in the vibrating energy mill is 25%. The voidage of cubes and prisms is generally lower than for cylinders; however, cylinders are preferred because circulation of the material to be size-reduced through the voids with respect to cylinders is found to be greatly improved over other shapes. Therefore, cylinders are preferred even though they have a lower voidage than spheres. Cylinders offer a further advantage compared to spheres in the close-packed system inasmuch as spheres give point contact only while cylinders provide line and plane contact, thereby increasing the potential impact surface area.

For further details relating to vibration energy mills, see the following British patents: 831,654; 849,340; 862,535; and 1,026,718.

It is essential to the process of this invention that the vibration energy milling, as hereinbefore described, be conducted upon a 5% to 10% roast and ground coffee/water slurry. In other words, the vibration energy milling process of this invention must be a wet milling process as distinguished from a dry milling process. If a dry milling process is used, coffee staling is much more pronounced and an insufficiene amount of particle dispersibility is provided to give sufficient flavor and aroma improvement without cup sediment in the resulting instant coffee product. On the other hand, if the amount of water utilized in the slurry is in excess of 95%, the amount of roast and ground coffee present in the slurry is insufficient to provide any significant increase in flavor and aroma. If the amount of roast and ground coffee contained in the medium to be charged to the vibration energy mill is in excess of 10%, i.e., greater than a 10% roast and ground coffee slurry, the medium is no longer of a low enough viscosity such that the slurry can be vibration energy milled without unduly impeding the movement of the slurry through the media. Stated another way, if the slurry is of more than 10% roast and ground coffee, the viscosity of the fluid is such that rather than being flowable the slurry becomes like a pudding and the increase in viscosity prevents a large number of impacts from occurring in the vibration energy mill, which in turn limits the maximum particle size reduction and, because of the larger particles, increases cup sediment.

The particle size of the colloidally suspended roast and ground coffee particles after vibration energy milling is typically less than 9 microns, and preferably less than 6 microns. Particles less than 6 microns in size have been found to be preferred because they provide the least amount of cup sediment and the greatest amount of flavor and aroma improvement with respect to the resulting soluble coffee product.

The amount of time required to produce in excess of 70% dispersibility of roast and ground coffee in a 5% to 10% slurry generally ranges from about 45 minutes up to in excess of 24 hours. However, preferred time limits are from 1 hour to 4 hours. The effect on particle size distribution and percent dispersibility of vibration energy milling time can be seen from the following table.

In the table the particle size and other data given at "0" hours milling time is typical data for colloid milled roast and ground coffee. As can be seen, the percent dispersibility is less than 70% which is the required minimum for the invention described herein. Thereafter the colloid milled coffee was used as starting material for the vibration energy milling process of this invention.

PARTICLE SIZE DISTRIBUTION AND DISPERSIBILITY VERSUS VIBRATION ENERGY MILLING TIME

| Milling time (hours) | Numerical percent | | | | | |
|---|---|---|---|---|---|---|
| | 0 | 1 | 2 | 3 | 4 | 18 |
| Particle diameter (microns): | | | | | | |
| 0-3 | 1.33 | 30.66 | 40.00 | 76.66 | 86.00 | 98.00 |
| 3-6 | 22.00 | 41.33 | 36.66 | 18.66 | 8.66 | 2.00 |
| 6-9 | 40.00 | 19.33 | 18.00 | 3.33 | 4.66 | |
| 9-18 | 19.33 | 8.66 | 4.66 | 0.66 | 0.66 | |
| 18-27 | 9.33 | | 0.66 | 0.66 | | |
| 27-36 | 1.33 | | | | | |
| 36-45 | 2.66 | | | | | |
| 45-54 | 1.33 | | | | | |
| 54-90 | 2.00 | | | | | |
| 90-160 | 0.66 | | | | | |
| Average particle size (microns) | 16.23 | 6.7 | 6.04 | 4.02 | 3.64 | 3.06 |
| Weight percent of roast and ground dispersed | 64.8 | 72.3 | 80.5 | 80.5 | 84.8 | 83.5 |

As can be seen from the above table, practical time considerations are from 1 to 4 hours to provide maximum dispersibility with minimum amount of time. The upper time limit of 24 hours is a practical one.

After forming the dispersion of a 5% to 10% roast and ground coffee slurry by vibration energy milling as above described, the dispersion is added back to the instant coffee processing stream after the instant coffee extract has been concentrated. To provide maximum flavor and aroma benefit with minimum amounts of coffee cup sediment, the amount of roast and ground coffee slurry added should be from 5% to 10% by weight of the coffee solubles in the concentrated coffee extract. Preferably, the amount of roast and ground coffee slurry added is from 5% to 8% by weight of the coffee solubles in the concentrated coffee extract. If the amount is in excess of 10% while the flavor and aroma is satisfactory, a substantial increase in cup sediment occurs as well as a high degree of turbidity in the resulting cup of coffee. On the other hand, if the amount is less than 5%, while cup sediment is no problem, the flavor and aroma improvement is hardly noticeable.

It is essential to the process of this invention that the resulting instant coffee extract and roast and ground coffee dispersion mixture be spray-dried. If the method of drying employed is freeze-drying, the amount of re-dispersion upon subsequent reconstitution of the dried product is very poor, and accordingly the amount of cup sediment is very high. The difference between spray-drying and freeze-drying is believed to be due to the physical difference in the mechanism of the two drying methods. It is believed that in freeze-drying the particles are forced in such close proximity that during the drying operation they form aggregates which settle out upon reconstitution. In spray-drying, however, the ultra-fine dispersed particles remain in colloidal suspension until the product is dry because they are allowed to remain mobile in the extract. Therefore, as the extract droplets dry, the soluble coffee contained therein probably forms a binder which helps suspend the roast and ground colloidal particles away from each other and prevents the formation of aggregates. Moreover, the small droplets from which the particles of instant powder are formed, it is believer, contain only a few colloidal ground particles and as a result the powder nature of the spray-dried instant coffee product is an additional aid in preventing roast and ground coffee particle aggregation during reconstitution.

Preferred spray-drying conditions which insure preventing of excess colloidal particle aggregation during reconstitution to form cups of instant coffee beverage are atomizing at moderate pressures, that is, about 300 p.s.i.g. to about 400 p.s.i.g.; and using extract having from about 35% to about 50% by weight coffee solubles, and preferably, from 40% to 50% by weight coffee solubles; and using moderate air inlet temperatures in the drying tower of from about 450° F. to about 500° F., and from about 230° F. to about 270° F. in the outlet. Utilizing the above spraying conditions, air inlet and air outlet temperatures and extract solubles concentrations and density insures the preparation of a light-colored instant coffee powder having suspended therein colloidally dispersed roast and ground coffee particles which, upon reconstitution, does not form large unsightly aggregates of roast and ground coffee particles within the coffee cup.

The process of this invention is further illustrated but not limited by the following example.

EXAMPLE

In this example, instant coffee extract was prepared in a six-column pilot plant countercurrent extraction train. Each column of the extraction train is five feet long and has a six-inch inside diameter. During the extraction operation, the columns are connected to one another by a liquid inlet line and a liquid outlet line. Each column is loaded with 20.2 pounds of blended roast and ground coffee. The blend consists, by weight, of 15% African Robustas, 50% Central American Arabicas, and 35% Brazilian and African Arabicas. The six-column extraction train is run using conventional extraction conditions. Beginning wth the column containing the most nearly exhausted coffee grounds and thereafter progressing sequentially to the column containing the freshest grounds, the inlet temperature to each column is as follows: 360° F., 350° F., 325° F., 310° F., 280° F., and 230° F. The pressure employed during the extraction cycle is 150 p.si.g, and the extraction cycle time is 20.0 minutes. The draw-off ratio is 2.0. 40.4 pounds of extract is obtained and concentrated to 50% solubles concentration by thin film evaporation. The concentrated instant coffee extract prepared as described above is thereafter set aside.

Subsequently, 2.2 pounds of the above-described blend of roast and ground coffee ground to U.S. Standard Sieve identified regular grind size, is utilized to prepare a 10% slurry of roast and ground coffee. This slurry is charged into the vibration energy mill previously described in the specification. The vibration energy mill has a vibrating vessel volume of 10.5 gallons and 75% of that volume is filled by the close packing medium which comprises small cylinders of alumina measuring ½ inch by ½ inch. The specific vibration energy mill utilized was a Sweco mill. The amount of packing material was 130 pounds. The amount of roast and ground coffee slurry subjected to vibration energy milling was 22 pounds. The amount of time of vibration energy milling of the slurry was 18 hours. Thereafter, the particle size of the dispersion was measured and the percent dispersibility was measured. The average particle size was 3 microns and the percent dispersibility based upon weight of roast and ground coffee employed in the slurry was 84%. 20 pounds of the above described roast and ground coffee slurry having 10% roast and ground coffee dispersed therein was added to 80 pounds of the 50% coffee extract. The total amount of roast and ground dispersed coffee present was 5% of the total amount of coffee solubles present.

The mixture was spray-dried in a spray dryer having a 15 cubic foot volume and an air inlet temperature of 475° F., and an air outlet temperature of 260° F., and a spray nozzle pressure of 350 p.s.i.g.

The resulting spray-dried instant coffee having roast and ground coffee dispersed therein was used to prepare cups of coffee beverage as follows. Two grams of the spray-dried instant coffee was placed in a cup and 180 ml. of water at a temperature of 175° F. was poured into the cup and stirred. The coffee when tasted and compared with a cup of conventional spray-dried instant coffee prepared as hereinbefore described except that no roast and ground coffee dispersion was added to the concentrate, was noted to be stronger in flavor, more fresh roast and ground coffee-like in aroma, and sediment-free. Only a slight amount of turbidity was present in the cup of beverage.

Substantially similar results are obtained in that a good aroma and flavor instant coffee having no cup sediment upon reconstitution results when the vibration energy milling time is 2 hours and the amount of vibration energy milled roast and ground coffee slurry added to the instant extract is 10% by weight of the coffee solubles present in the instant extract.

What is claimed is:

1. A process of forming a flavor- and aroma-improved instant coffee product having small amounts of roast and ground coffee dispersed therein, said product being cup sediment-free upon reconstitution, said process comprising:
    (a) producing a colloidal dispersion of roast and ground coffee and water wherein the level of dispersibility is in excess of 70% by weight of the roast and ground coffee, said dispersion being produced by vibration energy milling a water/roast and ground coffee slurry in a close-packed media, said slurry comprising from 5% to 10% by weight of roast and ground coffee;
    (b) adding the vibration energy milled slurry of step (a) to a concentrated coffee extract at a level of from 5% to 10% by weight of the coffee solubles in the concentrated coffee extract;
    (c) spray-drying the instant coffee extract and roast and ground coffee dispersion mixture of step (b) at air inlet temperatures of from about 450° F. to about 500° F., and at air outlet temperatures of from about 230° F. to about 270° F., utilizing atomizing pressures of from about 300 p.s.i.g. to about 400 p.s.i.g.

2. The process of claim 1 wherein the amount of roast and ground coffee slurry added to the instant coffee extract is from 5% to 8%.

3. The process of claim 1 wherein the concentrated extract has a concentration of from about 35% to about 50% by weight of coffee solubles.

4. The process of claim 1 wherein the extract has a concentration of from 40% to 50% by weight of coffee solubles.

References Cited

UNITED STATES PATENTS

| | | | |
|---|---|---|---|
| 3,345,182 | 10/1967 | Huste et al. | 99—71 |
| 2,022,467 | 11/1935 | Heyman | 99—77.1 |

FOREIGN PATENTS

| | | | |
|---|---|---|---|
| 1,495,566 | 8/1967 | France. | |
| 1,049,685 | 11/1966 | Great Britain | 241—26 |
| 2,332 | 5/1916 | Great Britain | 99—71 |
| 849,340 | 9/1960 | Great Britain. | |
| 1,026,718 | 4/1966 | Great Britain. | |

OTHER REFERENCES

Perry: Chemical Engineers' Handbook 4th ed., 1963, pp. 8–41.

FRANK W. LUTTER, Primary Examiner

W. L. MENTLIK, Assistant Examiner

U.S. Cl. X.R.

241—8